Dec. 13, 1955         J. R. HALL         2,726,502
SUPPORT FOR TRACTOR MOUNTED MOWER
Filed Oct. 7, 1952                  4 Sheets-Sheet 1
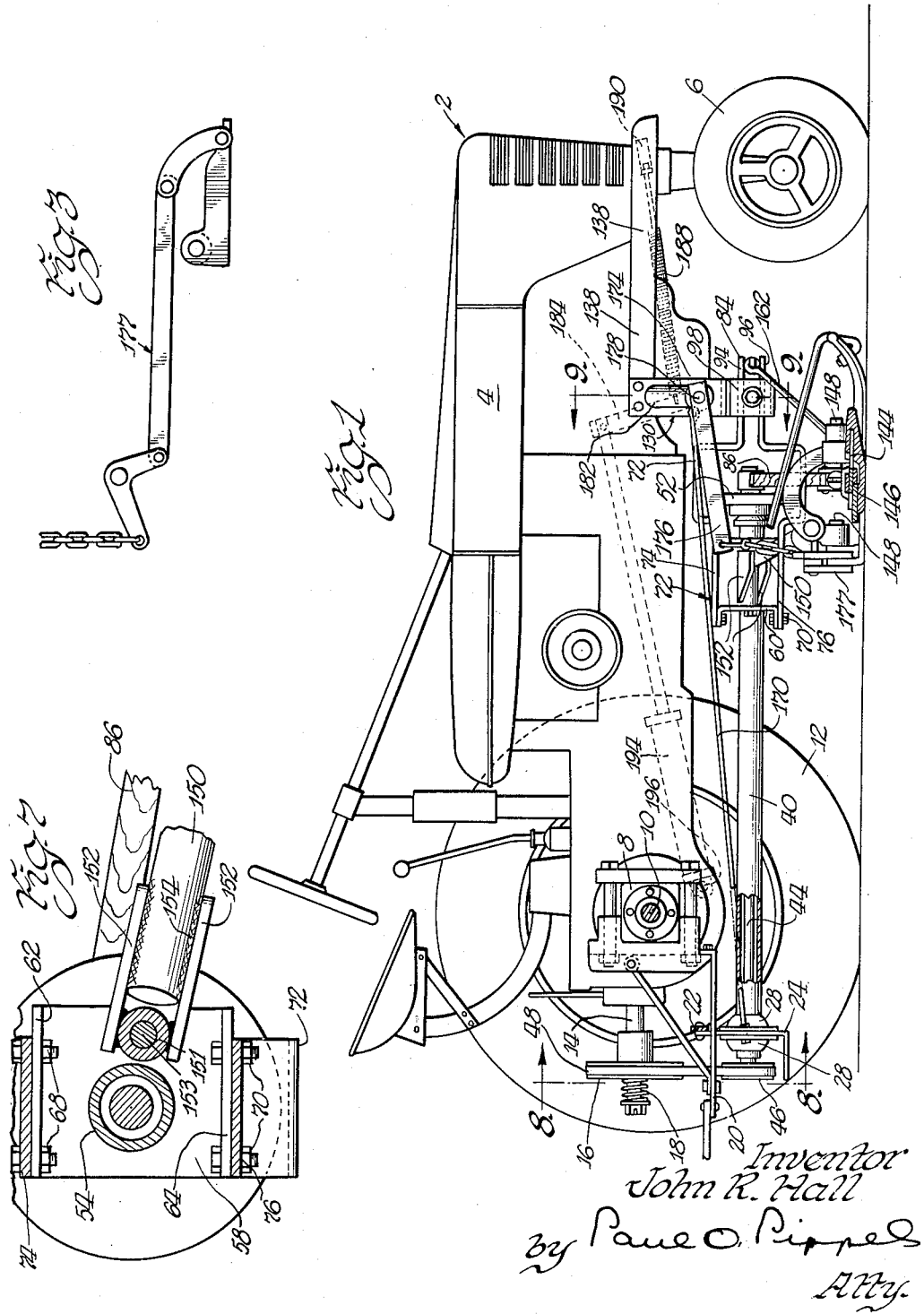
Inventor
John R. Hall
by Paul O. Pippel
Atty.

Dec. 13, 1955     J. R. HALL     2,726,502
SUPPORT FOR TRACTOR MOUNTED MOWER
Filed Oct. 7, 1952     4 Sheets-Sheet 2
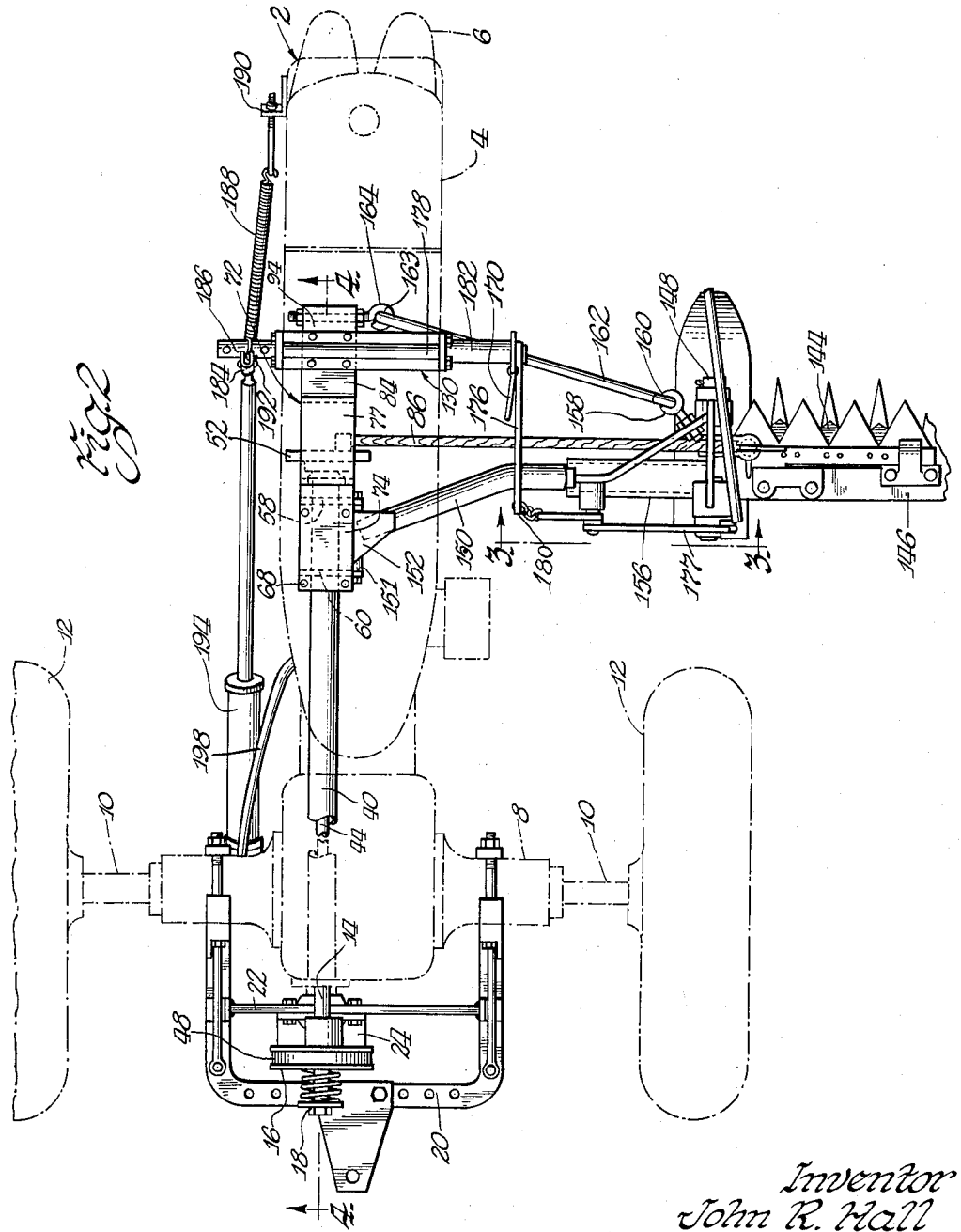

Dec. 13, 1955　　　J. R. HALL　　　2,726,502
SUPPORT FOR TRACTOR MOUNTED MOWER
Filed Oct. 7, 1952　　　4 Sheets-Sheet 3
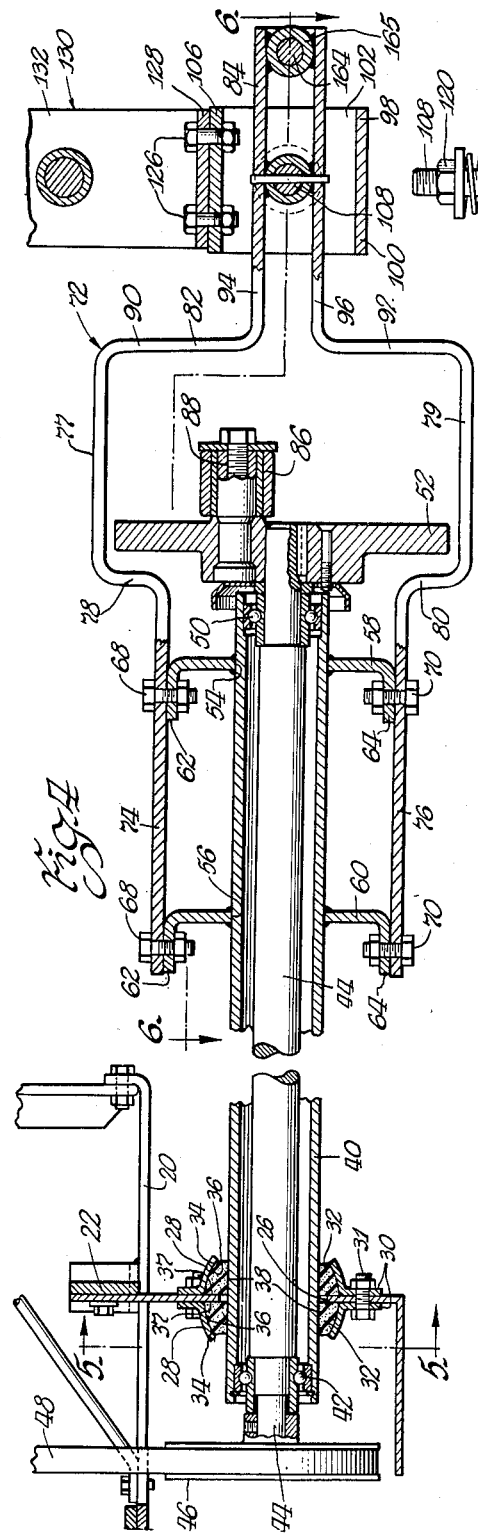
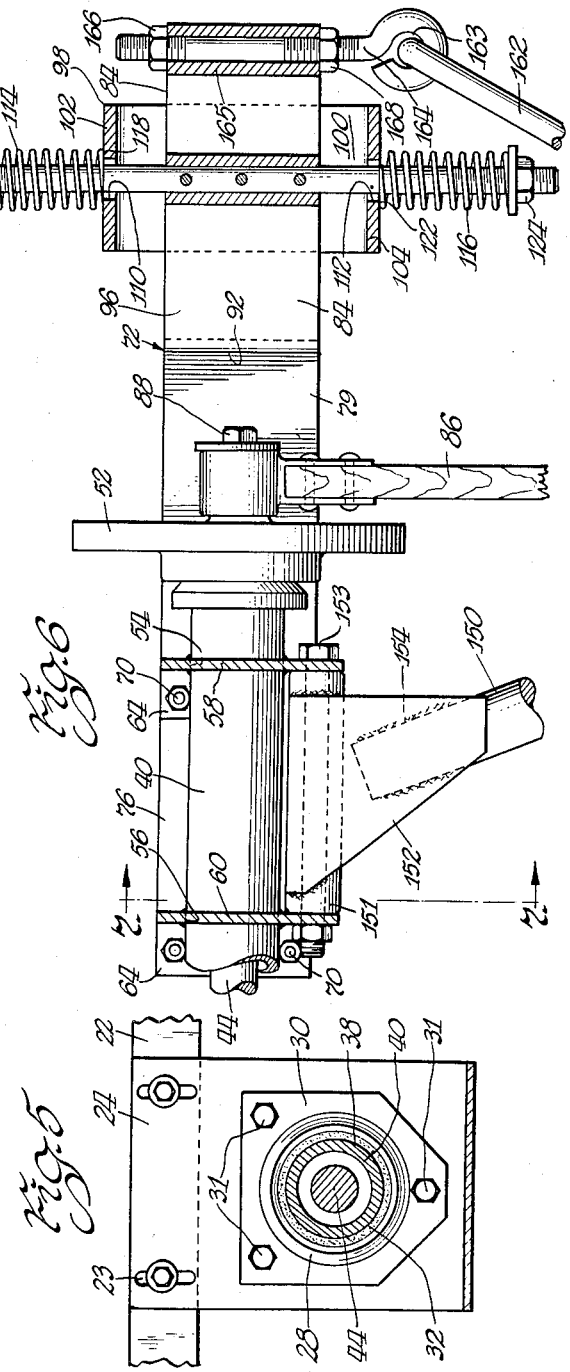
Inventor
John R. Hall
by Paul O. Pippel
Atty.

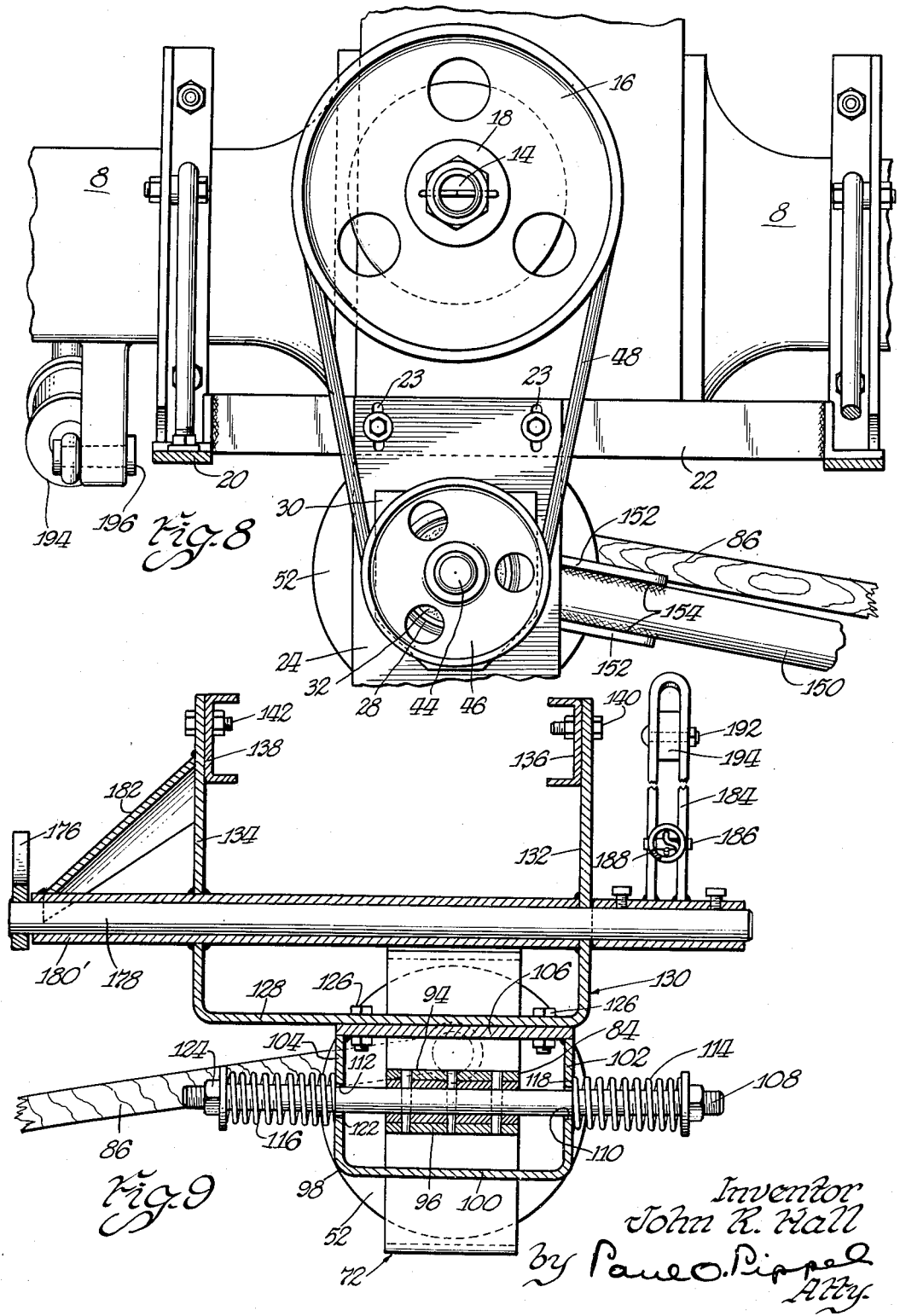

United States Patent Office 2,726,502
Patented Dec. 13, 1955

2,726,502

SUPPORT FOR TRACTOR MOUNTED MOWER

John R. Hall, Chicago, Ill., assignor to International Harvester Company, a corporation of New Jersey Application October 7, 1952, Serial No. 313,532

11 Claims. (Cl. 56—25)

This invention relates to mowers and more specifically to a novel mounting therefor.

A general object of the invention is to devise a novel suspension for a mower from a tractor of economical and rugged design and which effects a resilient mounting of the mower whereby obviating transmission of the severe vibrational shocks generated by the mower to the tractor.

A more specific object of the invention is to devise a novel mounting which is relatively easy to attach and detach with respect to an associated tractor and which will readily fit various tractors of conventional design currently in use.

The invention contemplates a novel floating mounting for the transmission linkage between the power-take-off of the tractor to the mower and incorporating spring means disposed in compression generally parallel to the operational plane of the pitman for absorbing the pounding shocks developed thereby.

The invention contemplates more specifically such a mounting of the linkage wherein the linkage incorporates a tube extending longitudinally of the tractor therebeneath and mounted at its rear extremity in a universal rubber mounting from a tractor-carried part, the forward end of the mounting incorporating a tongue entered into a stirrup secured to the underside of the tractor and the tongue carrying a crossbolt which extends through the sides of the stirrup and carries spring means compressed between the bolt and the remote sides of the stirrup.

A still further object of the invention is to devise a novel take-up arrangement between the mower and the tongue wherein the adjustment of a single bolt will obtain a proper disposition of the mower with respect to the intended line of draft of the unit.

A still further object is to devise a novel lifting and lowering arrangement for the mower wherein the linkage is arranged in a compact and efficient manner.

These and other objects of the invention will become more apparent from the specification and the drawings wherein:

Figure 1 is a side elevational view of a tractor and mower combination in accordance with the invention with the mower shown in cross-section;

Figure 2 is a top plan of the tractor and mower support combination; the tractor being in phantom and part of the mower broken off;

Figure 3 illustrates part of the lifting linkage on the line 3—3 of Figure 2;

Figure 4 is an enlarged longitudinal sectional view of the mower support frame and transmission taken generally on the line 4—4 of Figure 2;

Figure 5 is transverse vertical sectional view taken substantially on the line 5—5 of Figure 4;

Figure 6 is a fragmentary horizontal sectional view taken substantially in the plane indicated by the line 6—6 of Figure 4;

Figure 7 is a transverse vertical sectional view taken substantially on the line 7—7 of Figure 6;

Figure 8 is an enlarged transverse sectional view taken substantially on the line 8—8 of Figure 1; and Figure 9 is an enlarged transverse vertical sectional view taken generally on the line 9—9 of Figure 1.

Describing the invention in detail, the tractor generally designated 2 is of conventional design and comprises a body 4 supported at its front end from a steering truck 6 and at its rear end having a transverse axle housing 8 with the usual axles 10 extending from opposite ends thereof and mounting rear traction wheels 12. The tractor includes the usual power take-off shaft 14 at its rear extremity carrying a pulley 16 and connected therewith through a slip clutch 18.

The tractor carries a drawbar 20 at its rear end connected to the axle housing 8 in the usual manner and the drawbar mounts a transverse carrier bar 22 which, intermediate its ends, is adjustably connected as at 23 to a mounting plate 24 to accommodate vertical adjustment of the plate. The mounting plate 24 is provided adjacent to its lower end with a transverse opening or aperture 26 and at opposite sides of the hole carries, coaxial with the hole, spherical segmental rings 28, the rings extending laterally outwardly fore and aft of the plate and provided on the edges adjacent to the plate with outturned flanges 30 preferably bolted at 31 to the plate. Each metallic ring 28 snugly receives therein a resilient gasket annulus 32 formed of rubber or the like, and each gasket 32 has an external segmental spherical face 34 in complementary engagement with a corresponding spherical segment face 36 on the associated mounting ring 28. Each resilient ring 32 has a flat inner face 37 pressed against the adjacent side of the plate and has a cylindrical central aperture designated 38 and snugly receiving a housing tube 40 therethrough whereby affording a universal floating mounting for the tube.

The tube 40 extends longitudinally of the tractor and at its rear end projects slightly rearwardly of the plate 24 and at its forward extremity terminates in an area intermediate the front and rear extremities approximately medially, of the body 4 of the tractor thereabove. The tube 40 carries a bearing 42 within its rear extremity which journals a shaft 44 extending through the tube, the rear end of the shaft projecting outwardly of the rear end of the tube and being keyed to a pulley 46 disposed beneath and in vertical alignment with the pulley 16 and driven by the pulley 16 through a belt or chain 48. The belt and pulleys define driving means from the power-take-off shaft to the counter-shaft 44.

The forward end of the shaft 44 is journaled in a bearing 50 in the forward end of said tube and projects outwardly of the front end of the tube whereat it is keyed to an eccentric 52.

The tube or support structure 40 is weld-connected and extends at its front end through and about complementary apertures 54 and 56 in fore and aft mounting plates 58 and 60 spaced longitudinally of the tube and at their upper and lower ends presenting substantially parallel flanges 62 and 64 connected preferably as by bolts 68 and 70 respectively to the top and bottom legs 74 and 76 of a U-shaped combination mounting yoke and shield structure generally designated 72; the legs extending or being disposed above and below the tube 40 and projecting forwardly to adjacent the rear side of the eccentric 52 whereat, said legs are bent outwardly of the eccentric 52 as at 78 and 80, respectively, and thence continued parallel forwardly a substantial distance ahead of the eccentric. The forward ends of the legs 74 and 76 are joined together by the bight 82 of the U which intermediate its top and bottom margins is formed with a forwardly projecting generally horizontal tongue 84. The structure 72 provides a support for the forward end of the tube or transmission linkage. The bight 82 and the top and bottom portions 77, 79 of the legs about the eccentric form a convenient shield or guard therefor and the legs project a sufficient distance forwardly from the eccentric to permit application or removal of one end of a pitman 86 to the wristpin 88 associated with the eccentric.

It will be seen that the bight of the U is formed by bending portions 90 and 92 of the plates forming the legs 74 and 76 at their forward ends and that the tongue is formed by bending these plates to provide forwardly projecting generally parallel top and bottom portions 94 and 96.

The tongue 84 projects through a stirrup or support member 98 which includes a generally horizontal bottom wall or web 100 and spaced upstanding generally parallel side webs or legs 102 and 104, which, at their upper ends are weld-joined to a top mounting wall 106.

The tongue 84 is fastened as by pins or in any other convenient manner to a supporting cross-element in the form of a bolt 108, the bolt 108 extending therethrough and through larger aligned apertures 110 and 112 in the side walls 102 and 104 of the stirrup and supporting the tongue spaced above the bottom web 100 of the stirrup. The bolt 108 extends a considerable distance outwardly from the remote sides of the side webs 102 and 104 of the stirrup 98 and outwardly of these webs is ensleeved by compression springs 114 and 116, the spring 114 seating at its inner end as at 118 against the external side of the web 102 and at its outer end being engaged by a movable abutment in the form of a nut 120 bearing through a washer against the outer end of the associated spring 114, the nut 120 being adapted to be threaded or unthreaded with respect to the associated portion of the bolt to adjust the compression of the spring 114 between the same and the external side of the side wall 102 of the stirrup. Similarly, the other end portion of the bolt 108, outwardly of the wall 104, is ensleeved by the compression spring 116 which, at its inner end, seats or bears against the external side of the wall 104 as at 122 and at its external or other end is engaged by a movable abutment in the form of a nut 124 which is adapted to be threaded or unthreaded with respect to the related portion of the bolt 108 in order to vary the compression of the spring 116 between the same and the external side of the web 104 of the stirrup. It will be readily apparent that by varying the compression of the two springs any desired adjustment may be effected for positioning the tongue within the stirrup and aligning the tube 40 laterally in a generally horizontal plane. It will be seen that the reaction vector of the springs is generally parallel to the plane of action of the reciprocating pitman to counter the vibratory shocks developed thereby during operation.

The top wall 106 of the stirrup is connected preferably as by bolts 126 to the bottom web 128 of a U-shaped support structure or yoke 130 which is provided at opposite ends of the web 128 with upstanding legs 132 and 134 which at their upper ends are bolted to the side sills 136 and 138 of the body 4 of the tractor therebetween, the leg 132 being fastened as by bolts 140 to the sill 136 and the leg 134 being fastened as by bolts 142 to the sill 138. The support 130 may be functionally considered as part of the tractor.

The pitman 86 extends laterally outwardly of one side of the tractor, in the present instance the right side, and at its outer end is pivotally connected to the knife blade or sickle 144 carried by the cutter or mower bar 146. The cutter bar is pivotally connected, as by pins or bolts on a generally horizontal axis extending longitudinally of the tractor and identified 148, to the outer end of a casting 156 on the outer end of a coupling arm or bar 150, the inner end of the coupling arm extending between a pair of spaced top and bottom gusset plates 152 and preferably weld-connected thereto as at 154, said gusset plates projecting between the mounting plates 58 and 60 and welded to a tube 151 therebetween, the tube 151 journaled on a bolt 153 connected to the plates 58 and 60 as best seen in Figure 6 and providing a journal on a generally horizontal axis and parallel to shaft 44 as close as possible thereto. The coupling arm 150 includes the casting member 156 at its outer end to which is secured an eye 158 receiving a hook 160 at the rear end of a diagonally upwardly forwardly extending drag link 162, the upper forward end of the drag link being afforded a clevis connection 163 with one end of an adjusting bolt 164 extending through a tube 165 fastened in the forward end of the tongue generally horizontally therethrough forwardly of the stirrup. The bolt 164 is provided with adjusting and securing nuts 166 and 168 spaced axially thereon and abutting the opposite sides of the tongue. It will be readily appreciated that a ready adjustment of the drag link may be effected by loosening or tightening the nut 166 and tightening or loosening the nut 168.

It will be noted that the springs 114 and 116 and the bolt 108 serve not only to absorb the vibrations developed by the action of the knife and the pitman but also to take the shock of the cutter or mower striking an obstruction. It will be also appreciated that adjustment of the bolt 108 will swing the housing tube 40, which is part of the longitudinal support structure or frame for the mower unit, and the mower about the axis of the spherical mounting at the rear end of the tube whereby the position of the cutter bar may be easily adjusted merely by turning either nut 120 or 124.

As best seen in Figures 1 and 2 the cutter bar may be raised to transport position about the axis 148 and secured in such position by means of a conventional tie rod 170 shown in Figure 1 secured to plate 24, the rod 170 adapted in the raised position of the cutter to be fastened through a suitable aperture to the cutter bar, the rod 170 also being provided with a ring at its other end disposed back of a lifting arm 176 about a shaft 178 thereof. The lifting arrangement 177 between the cutter bar and the outer end 180 of the lever arm 176 is conventional as shown in Figure 3 and therefore will not be described. The other or inner end of the arm 176 is weld-connected to the shaft 178 which is journaled in a bearing 180' provided on the outer end of a standoff 182 extending laterally outwardly from the plate 134 and weld-connected thereto. The shaft 178 passes through openings in the arms 132 and 134 beneath the tractor to the opposite side thereof and at the far side of the tractor with respect to the mower is connected to an upstanding arm 184 which at one point 186 is pivotally connected to the rear end of a tension spring 188 extending forwardly of the arm and at its forward end connected to a bracket 190 mounted on the adjacent sill member. This spring 188 provides a balance for the mower unit. The upper end of the arm 184 is pivotally connected as at 192 to one end of an hydraulic motor 194 in the form of a piston and cylinder arrangement, said hydraulic motor 194 being pivotally connected as at 196 (Figure 8) to the adjacent portion of the rear axle housing 8. The hydraulic motor is connected in usual manner to a power source or pump of the tractor through a conduit 198.

In operation, lifting by the hydraulic motor initially raises the mower assembly about the point or bolt 153 at the inner end of the coupling arm 150. After the limit of upper movement of the entire assembly is reached, the linkage 177 pivots the cutter bar about the axis 148 to substantially upright position.

What is claimed is:

1. A mower for a tractor body carried on wheels, a transverse cutter bar extending from one side of the tractor body, a support for the cutter bar including a longitudinal structure disposed beneath the tractor body, spaced front and rear mounting means connected to the body and disposed respectively about the front and rear extremities of said structure, a resilient connection between the rear extremity of said structure and said rear mounting means, said front mounting means comprising a stirrup receiving the forward extremity of said longitudinal structure and having spaced upstanding side legs disposed at opposite sides of said structure in laterally spaced relationship thereto and having a transverse bottom web beneath the structure and interconnecting the lower extremities of said legs, a transverse bolt extending through aligned openings in said legs and the portion of said structure therebetween and connected to said portion, and adjusting nut threaded on each end of the bolt, a compression spring sleeved over each end of the bolt and compressed between the adjacent nut and external side of the adjacent leg of the stirrup, a drag link connected at one end to the cutter bar and extending diagonally upwardly forwardly therefrom to the forward end of said structure and adjustably connected therewith, and a coupling bar connected at one end to the cutter bar and at the other end to said structure intermediate the ends thereof.

2. A tractor-mounted mower comprising in combination, a vehicle having a longitudinal body carried on front and rear wheels, and having a rear end power-take-off, a continuous, rigid mower-carrying structure extending longitudinally of the body therebeneath and projecting at its rear end to a point immediately beneath the power-take-off, a support carried by the body, a resilient universal connection between the support and the rear end of said structure, a continuous, one-piece shaft carried within said structure and projecting out of the rear end thereof, pulleys on the power-take-off and rear end of the shaft, and a belt trained thereabout, a bracket carried by the body intermediate its ends, a resilient adjustable connection between the forward end of the structure and the bracket for shifting the forward end laterally about said universal connection, said structure having a long length forwardly of the universal connection and minimum length terminating immediately rearwardly of the connection whereby its forward end may be moved a substantial distance while the pulley on the rear end of the shaft is swung a minimum distance insufficient to disturb substantial alignment of the pulleys, a mower unit of the reciprocating sickle type connected to the structure at its front end, and drive transmitting means operatively associated with the mower unit and the forward end of the shaft, said resilient adjustable connection having an axis of reaction disposed generally horizontally and in shock absorbing relation to the operating movements of said mower unit.

3. In a mounting for a mower, an ambulant carrier structure and a fore and aft extending mower-support structure arranged in superposed relationship, a two point support between the carrier and the mower-support structures located at the opposite ends of the latter, one of said points incorporating a movable mounting, the other of said points comprising opposed portions on one structure spaced transversely of said second-mentioned structure and loosely receiving a portion of the other structure therebetween, and adjustable yieldable connecting means between said portions of the one structure and the portion of the other and including a rigid element connected to said portion and extending through aligned openings in said portions and resilient means adjustably stressed between the remote sides of said portions and said element and adapted, during adjustment, to swing said mower support structure about said movable mounting to adjust the position thereof relative to the carrier structure, and a mower unit connected to said mower-support structure.

4. In a mower-mounting structure adapted for attachment to an associated tractor, a longitudinal tube, a combination yoke and tongue structure having spaced top and bottom legs connected to the tube at its forward end and projecting forwardly thereof and offset away from each other forwardly of the tube to provide a shield for an associated eccentric, means interconnecting the legs at their forward ends, and a tongue projecting forward from said last-mentioned means.

5. In a mower for a tractor body, an elongated structure beneath said body and extending lengthwise thereof, front and rear means respectively movably mounting the front and rear ends of said structure from said body, a mower unit extending transversely of said structure and connected therewith, said front means comprising a stirrup having side portions spaced transversely of said tractor body and receiving said front end of said structure therebetween and disposed in laterally spaced relationship thereto, and means including resilient means reactively connected between each portion and said structure on an operational axis extending transversely of said tractor body.

6. In a mower-mounting structure adapted for attachment to an associated tractor, a longitudinal tube, a combination yoke and tongue structure having spaced top and bottom legs connected to the tube at its forward end and projecting forwardly thereof and offset away from each other forwardly of the tube to provide a shield for an associated eccentric, means interconnecting the legs at their forward ends, and a tongue projecting forward from said last-mentioned means, a stirrup having portions disposed at opposite sides and bottom of the tongue in spaced relationship thereto, rigid means connected to the tongue and extending through openings in the portions at opposite sides of the tongue, and spring means compressed between the remote sides of said last-mentioned portions and said rigid means for yieldingly resisting lateral movement of said structure with respect to the stirrup, said stirrup having means for attachment to an associated tractor.

7. In a mower-mounting structure adapted for attachment to an associated tractor, a longitudinal tube, a combination yoke and tongue structure having spaced top and bottom legs connected to the tube at its forward end and projecting forwardly thereof and offset away from each other forwardly of the tube to provide a shield for an associated eccentric, means interconnecting the legs at their forward ends, and a tongue projecting forward from said last-mentioned means, a stirrup having portions disposed at opposite sides and bottom of the tongue in spaced relationship thereto, rigid means connected to the tongue and extending through openings in the portions at opposite sides of the tongue, and spring means compressed between the remote sides of said last-mentioned portions and said rigid means for yieldingly resisting lateral movement of said structure with respect to the stirrup, said stirrup having means for attachment to an associated tractor, and said structure comprising a laterally extending coupling arm connected at one end to the rear ends of the legs of said yoke.

8. In a mower-mounting structure adapted for attachment to an associated tractor, a longitudinal tube, a combination yoke and tongue structure having spaced top and bottom legs connected to the tube at is forward end and projecing forwardly thereof and offset away from each other forwardly of the tube to provide a shield for an associated eccentric, means interconnecting the legs at their forward ends, and a tongue projecting forward from said last-mentioned means, a stirrup having portions disposed at opposite sides and bottom of the tongue in spaced relationship thereto, rigid means connected to the tongue and extending through openings in the portions at opposite sides of the tongue, and spring means compressed between the remote sides of said last-mentioned portions and said rigid means for yieldingly resisting lateral movement of said structure with respect to the stirrup, said stirrup having means for attachment to an associated tractor, said structure comprising a laterally extending coupling arm connected at one end to the rear ends of the legs of said yoke, and a drag link adjustably connected at one end to the forward end of the tongue forwardly of the stirrup, and means connecting the other end of the link with the other end of the coupling arm.

9. For use with a tractor, a mower-mounting structure, comprising an elongated tube, front and rear attaching means associated with opposite ends of said tube for connection to an associated tractor, a pair of radially projecting members on the tube and spaced longitudinally thereof, a coupling bar having an inner end between said members and pivoted thereto on an axis generally parallel to said tube, mower means connected to the opposite end of said bar, a power-take-off driven shaft journalled in said tube, a flywheel with a wrist pin connected to said shaft, and a pitman connected to said wrist pin and said mower means and extending alongside said coupling bar at least one of said attaching means incorporating a first part attachable to the tractor and a second part connected to said tube and resilient means interposed between said parts and oriented transversely of the tractor to accommodate through deflection lateral movement of the related end of said structure, and the other of said attaching means formed and arranged to accommodate coincident swinging movement of said structure about a vertical axis.

10. In a mower mounting, a support structure, means for attaching said structure to an associated tractor including a support member having a pair of laterally spaced upright portions adapted for attachment to the tractor and receiving a portion of said structure therebetween, and means for sustaining said structure from said member and connected to said portion of the structure and extending transversely of said portions of said member through openings therein, and resilient means under compression between said last-mentioned means and respective portions of said member for yieldingly resisting lateral movement of said structure.

11. In a mowing machine adapted for attachment to a tractor, said mowing machine including a mower bar, an oscillating sickle, and a coupling bar, one end of which is secured to said mower bar, said coupling bar extending generally laterally of the tractor, a structure comprising an elongated member extending lengthwise of the tractor and connected to the other end of said coupling bar, a support for said structure mounted on the tractor and including distortable elastic material, and means stressing said material under compression between said support and said structure transversely of the tractor and generally parallel to said mower bar and sickle whereby floating said structure and coupling bar so that vibration transmitted through the coupling bar and structure are damped.

References Cited in the file of this patent

UNITED STATES PATENTS

| | | |
|---|---|---|
| 1,398,831 | Bliss | Nov. 29, 1921 |
| 1,824,822 | Kradolfer | Sept. 29, 1931 |
| 2,162,159 | Cole | June 13, 1939 |
| 2,311,095 | Simpson et al. | Feb. 16, 1943 |
| 2,458,670 | Young, Jr. | Jan. 11, 1949 |
| 2,523,741 | Weschler et al. | Sept. 26, 1950 |
| 2,596,641 | Bert et al. | May 13, 1952 |
| 2,628,467 | Gillespie | Feb. 17, 1953 |